US009831653B2

United States Patent
Ritter

(10) Patent No.: US 9,831,653 B2
(45) Date of Patent: Nov. 28, 2017

(54) CABLE TWIST ALLOWANCE SYSTEM FOR POWER SYSTEM

(71) Applicant: GE Energy Power Conversion Technology Ltd, Rugby, Warwickshire (GB)

(72) Inventor: Allen Michael Ritter, Salem, VA (US)

(73) Assignee: GE ENERGY POWER CONVERSION TECHNOLOGY LTD (GB)

( * ) Notice: Subject to any disclaimer, the term of this patent is extended or adjusted under 35 U.S.C. 154(b) by 267 days.

(21) Appl. No.: 14/715,983

(22) Filed: May 19, 2015

(65) Prior Publication Data

US 2016/0341181 A1   Nov. 24, 2016

(51) Int. Cl.
  *F03D 80/80* (2016.01)
  *H02G 11/00* (2006.01)
  *H02G 3/32* (2006.01)
  *H02G 7/12* (2006.01)

(52) U.S. Cl.
  CPC ............ *H02G 11/00* (2013.01); *F03D 80/85* (2016.05); *H02G 3/32* (2013.01); *H02G 7/12* (2013.01); *Y02E 10/72* (2013.01)

(58) Field of Classification Search
  CPC .......... F03D 80/80; F03D 80/82; F03D 80/85; H02G 3/32; H02G 7/12; H02G 11/00
  USPC ....................................... 416/146 R; 174/480
  See application file for complete search history.

(56) References Cited

U.S. PATENT DOCUMENTS

| 4,545,728 A | 10/1985 | Cheney, Jr. |
| 8,058,740 B2 | 11/2011 | Altenschulte et al. |
| 8,366,396 B2 | 2/2013 | Barton et al. |
| 2013/0068496 A1 | 3/2013 | Domesle et al. |
| 2015/0222106 A1* | 8/2015 | Caspari ............... H02G 3/32 174/651 |

FOREIGN PATENT DOCUMENTS

| CN | 202545130 U | 11/2012 |
| CN | 202746120 U | 2/2013 |
| CN | 103758709 A | 4/2014 |

(Continued)

OTHER PUBLICATIONS

European Search Report and Opinion issued in connection with corresponding EP Application No. 6169758.6 on Oct. 6, 2016.

(Continued)

*Primary Examiner* — Dwayne J White
*Assistant Examiner* — Aaron R Eastman
(74) *Attorney, Agent, or Firm* — GE Global Patent Operation; Scott R. Stanley

(57) ABSTRACT

Provided is a cable twist allowance system for a wind turbine system. The system includes a sun gear disposed within a tower of wind turbine, a pivot disk connected with the sun gear, a plurality of lever members, each including a plurality of cables and spaced a predetermined distance apart from each other, the plurality of level members being pivotably connected with a surface of the pivot disk and rotatable about the sun gear; and a plurality of compression members, each compression member corresponding to each lever member and adjusting a position of a respective lever member based on a radial force applied to the plurality of cables of the respective lever member.

14 Claims, 6 Drawing Sheets

(56) References Cited

FOREIGN PATENT DOCUMENTS

| EP | 2587054 A2 | 5/2013 |
|---|---|---|
| EP | 2409031 B1 | 8/2013 |
| JP | 2008298051 A | 12/2008 |
| NO | 2014053230 A1 | 4/2014 |

OTHER PUBLICATIONS

Liu et al., "Design of a large scale wind turbine generator set yaw system", Computer Science & Education (ICCSE), 2011 6th International Conference, pp. 915-918, Aug. 2011.

Chunyan et al., "Study on the prevent cable twisting control strategy of wind turbine yaw control system.", Instrumentation and Measurement, Sensor Network and Automation (IMSNA), 2013 2nd International Symposium, pp. 420-424, Dec. 2013.

European search report issued in connection with Corresponding European Application No. 16169758.6 dated Mar. 14, 2017.

\* cited by examiner

CABLE TWIST ALLOWANCE SYSTEM FOR POWER SYSTEM

I. TECHNICAL FIELD

The present invention relates generally to cable twist allowance system for power systems. In particular, the present invention relates to a cable twist allowance system for power systems such as wind turbine systems.

II. BACKGROUND

In a wind turbine system, the wind turbine converts kinetic energy in wind into mechanical energy to be supplied for use within a power grid. An example of a conventional wind turbine system is shown in FIG. 1. The system of FIG. 1 includes a wind turbine 2 with a tower 4, for supporting a nacelle 6 including various components for operating the system. Some of the components include a drive train 8 for driving the wind turbine 2.

A hub 9 has a plurality of rotatable blades 10 that form a rotor at an end of the drive train 8. The blades 10 rotate to drive a gearbox 12 connected to an electrical generator 14 and a control system 16. The control system 16 receives input from an anemometer (i.e., wind-speed monitor) 18 that measures wind speed and direction. A plurality of cables 20 extend from the electrical generator 14 to provide power to the grid.

The control system 16 provides control signals for operation of the wind turbine 2. A yaw drive 24 and yaw deck 26 provide yaw orientation for the wind turbine 2. The yaw orientation is controlled by the control system 16, based on information received from the anemometer 18.

A conventional method for cabling in wind turbine systems involves hanging cables in a free-hanging loop for a suitable distance and then attaching the cables to the sidewall of the tower 4 in a ribbon-type arrangement. The free-hanging loop allows for twisting of the cables as a result of the operation of the yaw drive 24. This method, however, can cause overtwisting and overcrowding of the cables 20 within the tower 4. This overtwisting and overcrowding results in overheating and abrasion of the cables leading to failure of the components within the nacelle 6. This failure creates interference in the supply of power through the tower and to the power grid.

III. SUMMARY OF THE EMBODIMENTS

Given the aforementioned deficiencies, a need exists for methods and systems that provide a cable twist allowance system that prevents overcrowding and overheating of cabling therein.

In one exemplary embodiment, a cable twist allowance system for a wind turbine system is provided. The system includes a sun gear disposed within a tower of wind turbine, a pivot disk connected with the sun gear, a plurality of lever members, each including a plurality of cables and spaced a predetermined distance apart from each other, the plurality of level members being pivotably connected with a surface of the pivot disk and rotatable about the sun gear; and a plurality of compression members, each compression member corresponding to each lever member and adjusting a position of a respective lever member based on a radial force applied to the plurality of cables of the respective lever member.

In another exemplary embodiment, a cable twist allowance system for a wind turbine system is provided. The system includes a hoop portion housed within a tower of the wind turbine and comprising a plurality of openings; and a plurality of cables disposed in cable sets and being received within the openings. A number of the cable sets are disposed along an outer periphery region of the hoop portion and a remaining number of the cable sets are disposed along an inner surface of the hoop portion. When the plurality of cables are twisted due to radial force applied thereto, the hoop portion is deformed and a position of the cable sets is adjusted to be in a central region of the hoop portion.

The foregoing has broadly outlined some of the aspects and features of various embodiments, which should be construed to be merely illustrative of various potential applications of the disclosure. Other beneficial results can be obtained by applying the disclosed information in a different manner or by combining various aspects of the disclosed embodiments. Accordingly, other aspects and a more comprehensive understanding may be obtained by referring to the detailed description of the exemplary embodiments taken in conjunction with the accompanying drawings, in addition to the scope defined by the claims.

IV. DESCRIPTION OF THE DRAWINGS

Figure 1:
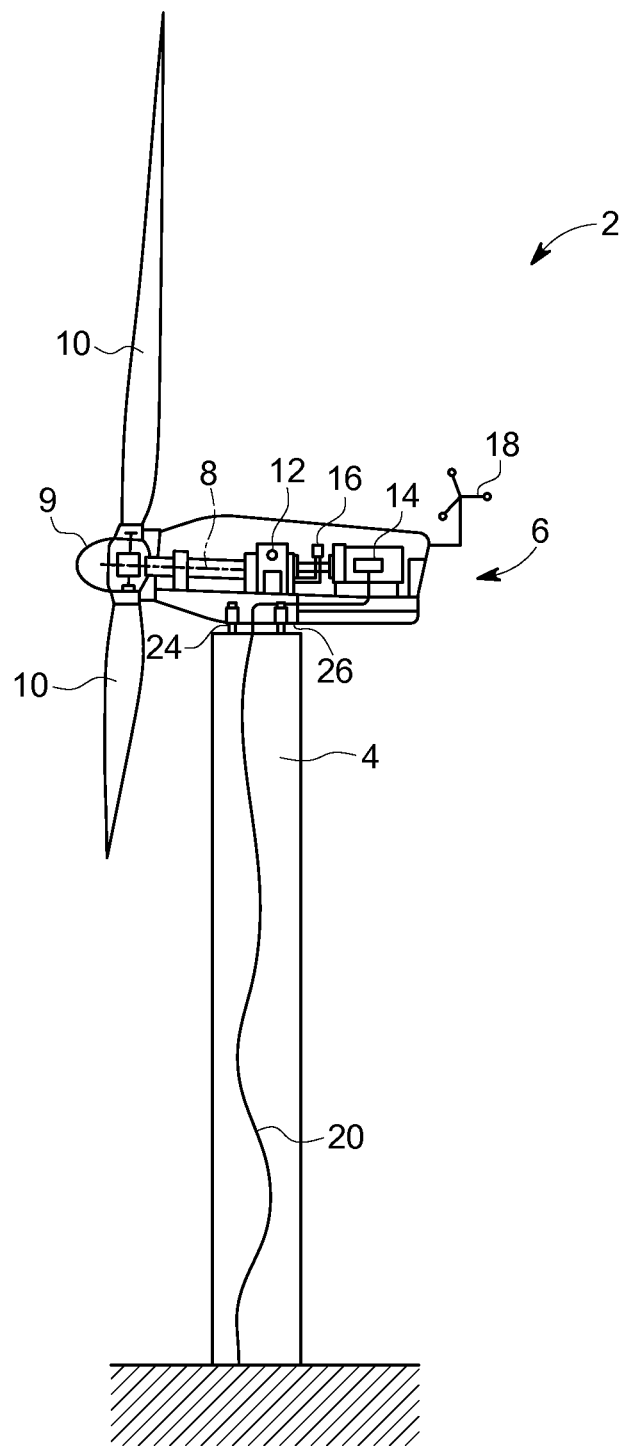
FIG. 1 is a schematic side view of a conventional wind turbine system.

The drawings are only for purposes of illustrating preferred embodiments and are not to be construed as limiting the disclosure. Given the following enabling description of the drawings, the novel aspects of the present disclosure should become evident to a person of ordinary skill in the art. This detailed description uses numerical and letter designations to refer to features in the drawings. Like or similar designations in the drawings and description have been used to refer to like or similar parts of embodiments of the invention.

V. DETAILED DESCRIPTION OF THE EMBODIMENTS

As required, detailed embodiments are disclosed herein. It must be understood that the disclosed embodiments are merely exemplary of various and alternative forms. As used herein, the word "exemplary" is used expansively to refer to embodiments that serve as illustrations, specimens, models, or patterns. The figures are not necessarily to scale and some features may be exaggerated or minimized to show details of particular components. In other instances, well-known components, systems, materials, or methods that are known to those having ordinary skill in the art have not been described in detail in order to avoid obscuring the present disclosure. Therefore, specific structural and functional details disclosed herein are not to be interpreted as limiting, but merely as a basis for the claims and as a representative basis for teaching one skilled in the art.

Exemplary embodiments of the present invention provides a cable twist allowance system that can be implemented within a power system such as a wind turbine system to prevent overtwisting and overcrowding of the cables within the tower thereof. The present invention is not limited to being used in a wind turbine system and may therefore be implemented within any type of power system or other system including a cable arrangement for supplying power therein.

The present invention provides a cable twist allowance system which controls axial tension in the surface of the column of cables in the tower of the wind turbine system through the radial forces on the individual sets of cables.

Figure 2A:
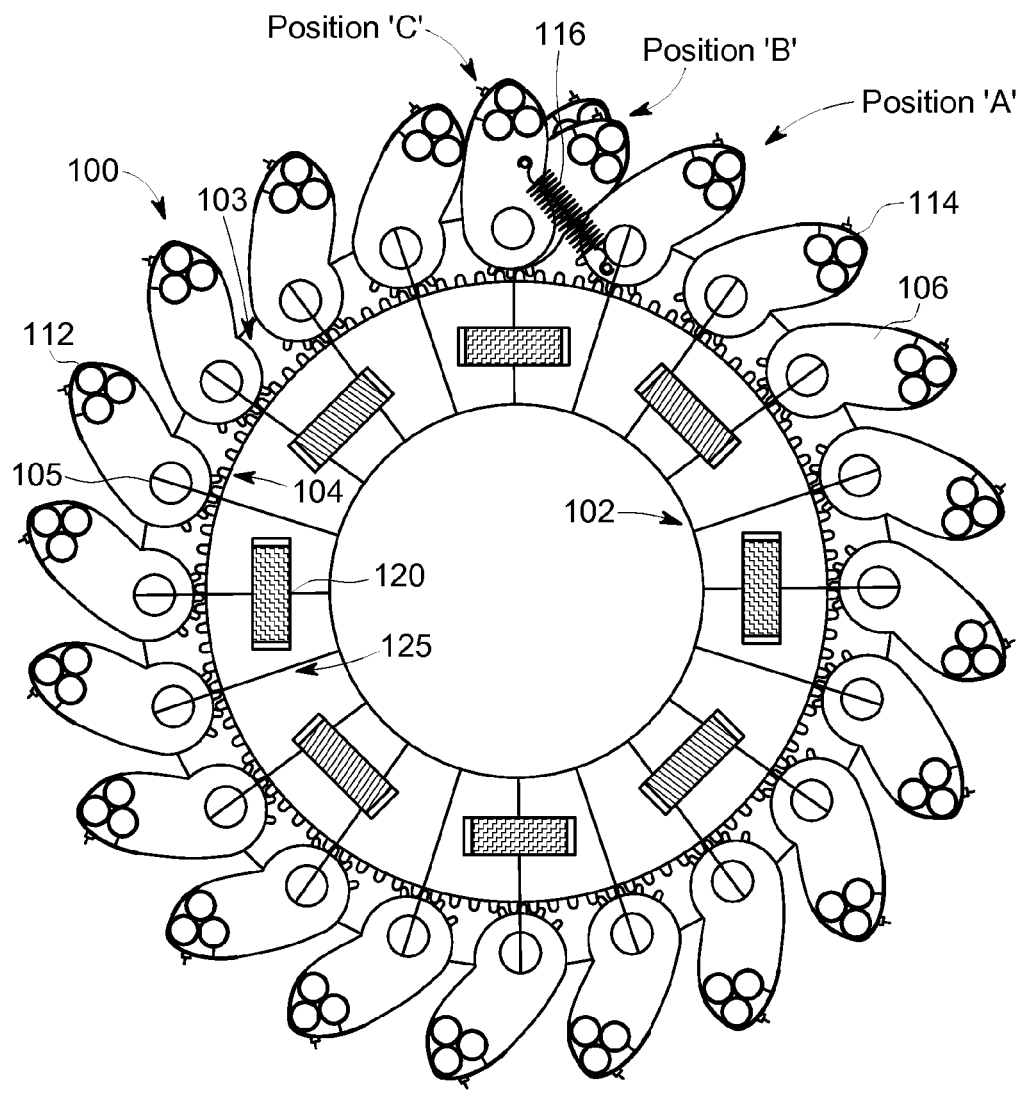
FIG. 2A is a schematic top view of a cable twist allowance system that can be implemented within one or more embodiments of the present invention.
Figure 2B:
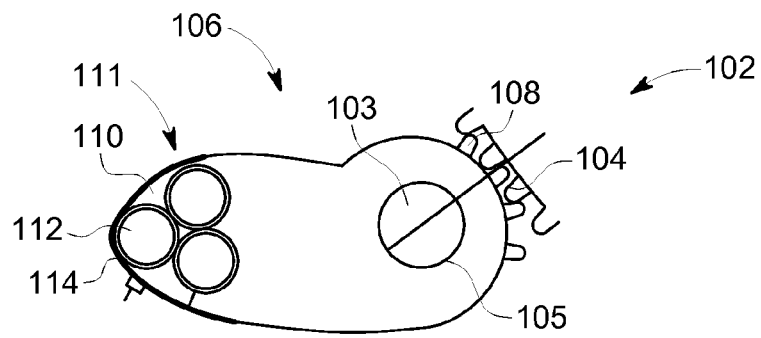
FIG. 2B is an exploded view of a lever of the cable twist allowance system shown in FIG. 2A that can be implemented within one or more embodiments of the present invention.

FIG. 2A is a schematic top view of a cable twist allowance system 100 that can be implemented within one or more embodiments of the present invention. FIG. 2B is an exploded view of a lever of the cable twist allowance system shown in FIG. 2A that can be implemented within one or more embodiments of the present invention. Details regarding the cable twist allowance system according to one or more embodiments of the present invention will now be discussed below with reference to FIGS. 2A and 2B.

As shown, the cable twist allowance system 100 includes a sun gear 102 and a pivot disk 105 connected together. The sun gear 102 is formed of a diameter ranging from approximately 50 inches to 50 feet for example. The sun gear 102 is positioned within the tower of the wind turbine system. The sun gear 102 may be formed of a material including metal and hard plastic, for example. A single sun gear 102, or a plurality of sun gears 102, may be provided within the tower for supporting the cabling therein. The present invention is not limited to a particular number of sun gears 102.

The sun gear 102 includes a plurality of gears 104 along a periphery region thereof for mating.

The cable twist allowance system 100 further includes a plurality of lever members 106 to be spaced apart a predetermined distance from each other along a surface of the pivot disk 103. As shown in FIG. 2B, the level members 106 each include an opening 105 for pivotably connecting with a surface of the pivot disk 103 and a plurality of gears 108 at one end thereof for engaging with corresponding gears 104 of the sun gear 102. The level members 106 are rotatably attached to the sun gear 102 via the gears 108. Each lever member 106 further includes a housing section 110 at an opposite end thereof along a periphery region 111 of the level member 106 for housing cables 112 therein.

The housing section 110 is formed by a wire restraint portion 114 creating a space within the lever member 106 for receiving the cables 112. The wire restraint portion 114 is configured to restrain the cables 110. As shown, the cables 112 include three separate cables representing three-phase AC power system formed in cable sets. However, the present invention is not limited to a three-phase power system. The cables 112 may include low-voltage (up to 105° C.) power cables, medium-voltage (approximately 180° C.) power cables, for example. However, the present invention is not limited.

The cable twist allowance system 100 further comprises a lever compression member 116 configured to connect a lever member 106 to an adjacent lever member 106 as shown in FIG. 2A. The lever compression member 116 may be a spring or any type of compression mechanism suitable for the purposes set forth herein.

The lever compression member 116 adjusts a position of the lever member 106 and controls axial tension on the system 100, when radial forces are applied to the cables 112. A single lever compression member 116 is shown in FIG. 2A for illustration purposes only. The cable twist allowance system 100 comprises a plurality of level compression members 116 to connect each lever member 106 to an adjacent lever member 106 along the periphery region of the sun gear 102. That is, in the embodiment of the present invention, a corresponding lever compression member 116 is provided for each lever member 106.

The position of the lever member 106 may range from Position A, Position B, and Position C as shown in FIG. 2A, depending on the amount of tension applied. The lever compression member 116 controls the position of the lever member 106 based on the tension applied thereto. For example, if a nominal amount of tension is applied, e.g., only the weight of the lever member 106, the position of the respective lever member 106 is Position 'A'. Thus, the lever compression member 116 dominates the position of the lever member 106.

If minimal tension is applied, the position of the respective lever member 106 is adjusted to Position 'B' as shown. On the other hand, if a large amount of tension is applied, the position of the respective lever member 106 is adjusted to Position C. The lever compression member 116 attempts to maintain the lever member 106 in the Position 'A' but the position may be adjusted based on the force on the cables 112. Thus, the diameter of the cable twist allowance system 100 may vary dependent upon the force being applied to the cables 112.

The range of the lever motion combines the twist of the cables 112 and the radius expansion and compression (i.e., the diameter) of the cable twist allowance system.

According to another embodiment of the present invention, the cable twist allowance system 100 may comprise a plurality of tension/compression members 120 instead of the lever compression members 116. The tension/compression members 120 are disposed along central area surface 125 of the sun gear 102. The tension/compression members 120 may be arranged to correspond to, and be in connection with, one or more lever members 106. The tension/compression members 120 are configured to adjust the position of the lever members 106 based upon the radial forces applied to the cables 112.

In this embodiment, the sun gear 102 is used to duplicate the lever position for a total of the lever members 106 to correspond to each other.

Figure 3A:
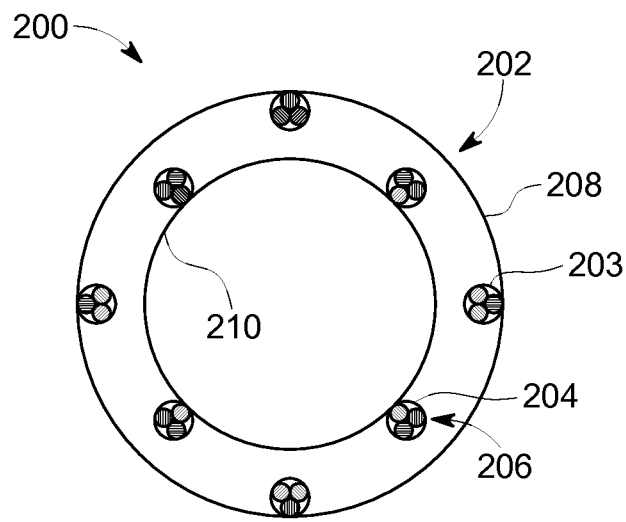
FIGS. 3A and 3B are schematic top views of a cable twist allowance system that can be implemented within one or more alternative embodiments of the present invention.
Figure 3B:
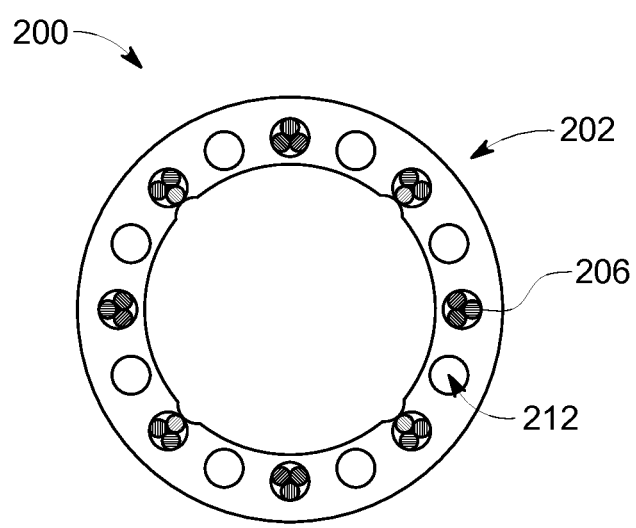

FIGS. 3A and 3B are schematic top views of a cable twist allowance system that can be implemented within one or more alternative embodiments of the present invention. As shown in FIG. 3A, the cable twist allowance system 200 includes a hoop portion 202 including openings 203 for receiving a plurality of cables 204 formed in cable sets 206 therethrough. The cables 204 are untwisted and the hoop portion 202 is relaxed such that some of the cable sets 206 are disposed along an outer periphery region 208 of the hoop portion 202.

The remainder of the cable sets 206 are disposed along an inner surface 210 of the hoop portion 202. The hoop portion 202 is formed of an elastic material such as rubber, or some other type of flexible material suitable for the purposes set forth herein. As shown in FIG. 3A, when the cables 204 are twisted due to tension increased within the wind turbine system, the hoop portion 202 is deformed and the position of the cable sets 206 are adjusted to be in a center region 212 of the hoop portion 202.

Figure 4:
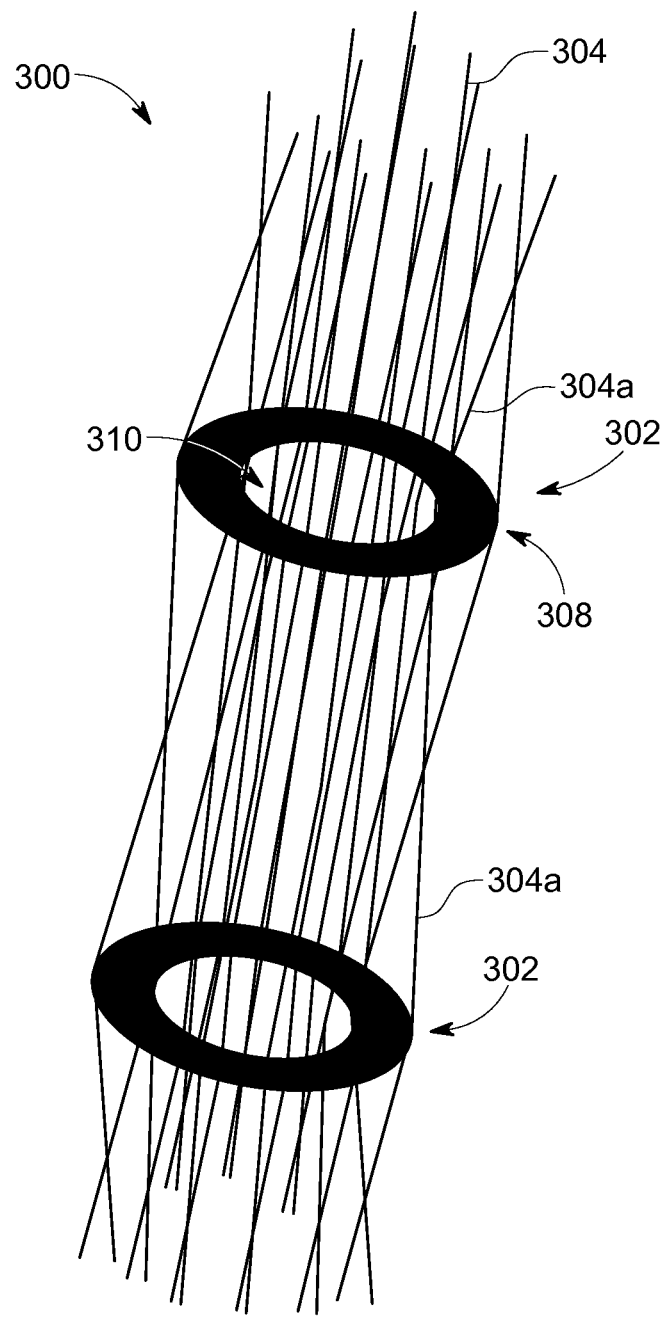
FIG. 4 is a schematic view of the cable twist allowance system as shown in FIGS. 3A and 3B that can be implemented within one or more alternative embodiments of the present invention.

FIG. 4 is a schematic view of the cable twist allowance system as shown in FIGS. 3A and 3B that can be implemented within one or more alternative embodiments of the present invention. As shown in FIG. 4, the cable twist allowance system 300 is provided. The cable twist allowance system 300 includes an alternating cable zigzag type arrangement to minimize overtwisting and overcrowding of cables within the tower of the wind turbine system.

The cable twist allowance system 300 includes a plurality of hoop portions 302 similar to the hoop portion 202 shown in FIGS. 3A and 3B The hoop portions 302 receive a plurality of cables 304 outside, along a periphery region 308 of the hoop portions 302 and inside a center region 310 thereof. The cables 304 are arranged to zigzag between the hoop portions 302. For example, a cable 304a is disposed inside the center region 310 of one hoop portion 302 and then outside the other hoop portion 302 in a zigzag manner to prevent overcrowding and overtwisting of the cables 304. The present invention is not limited to any particular number of hoop portions 302 or cables 304 and may vary as needed.

Figure 5:
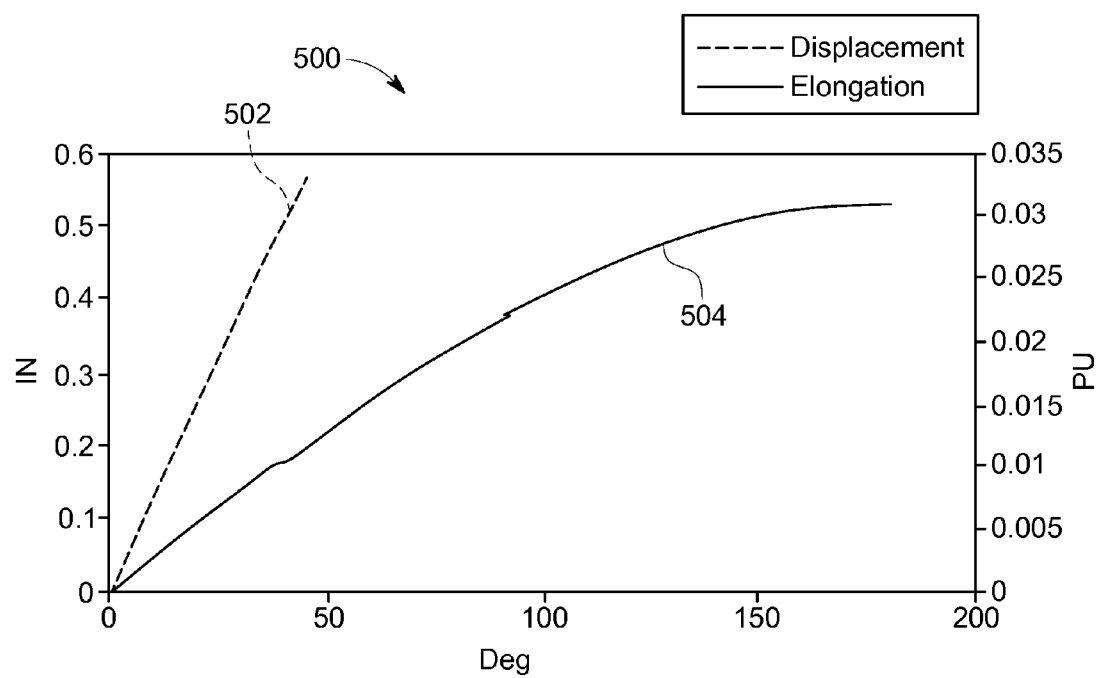
FIG. 5 is a graph illustrating zigzag displacement cable parameters for performing zigzag displacement of cabling as shown in FIG. 4 according to one or more embodiments of the present invention.

FIG. 5 is a graph illustrating zigzag displacement cable parameters for performing zigzag displacement of cabling as shown in FIG. 4 according to one or more embodiments of the present invention. As shown in the graph 500, the required twist allowance length of the cables 304 (as depicted in FIG. 4) is dependent upon the desired degree of turn or twist of each cable 304 and the length of the cable 304.

For example, if the desired degree of turn or twist is 50 degrees, and the length of the cable 304 is 4 feet, approximately 0.6 inches will be the required twist allowance needed as indicated by line 502. If the cable 304 is of a longer length to radius or degree of turn, then less required twist allowance length is needed for turning or twisting as indicated by line 504. The length of a helix (cable) can be estimated by the square root of the length squared plus the total circumference of the traversed in the twist. This works out to be approximately 7% additional length for 6" radius column spacing of 20 feet (ft) having 2.5 revolutions of twist or a 9" displacement in a zigzag pattern repeated 5 times along the column.

Figure 6:
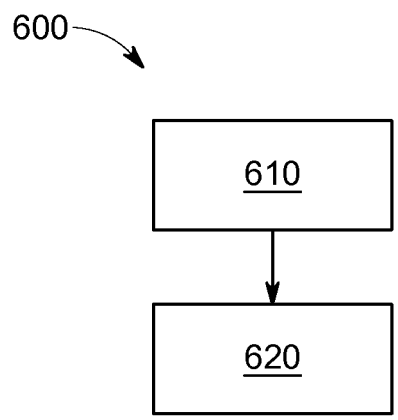
FIG. 6 is a flow diagram illustrating an exemplary method for performing cable twist allowance in the system shown in FIG. 2A, that can be implemented in an embodiment of the present invention.

FIG. 6 is a flow diagram illustrating an exemplary method for performing cable twist allowance within the system shown in FIG. 2A, that can be implemented in an embodiment of the present invention. The method 600 will be described with reference to FIG. 2A. The method begins at operation 610 where cables are received within a cable twist allowance system housed within the tower of a wind turbine system. The cables in cable sets are received within housing sections of lever members attached to a periphery region of a sun gear of the cable twist allowance system.

From operation 610, the process continues to operation 620 where when radial forces are applied to the cables, the position of the respective lever member is adjusted via a corresponding lever compression member, based on the amount of tension applied. The adjustment of the position of the lever member adjusts the diameter of the cable twist allowance system within the tower.

Figure 7:
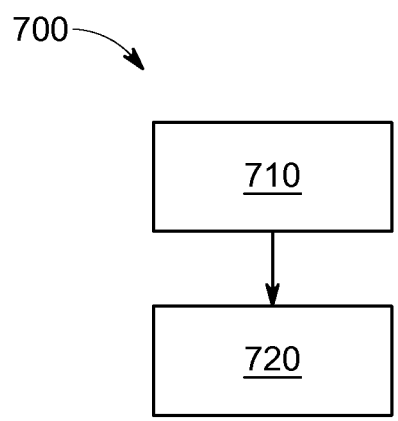
FIG. 7 is a flow diagram illustrating an exemplary method for performing cable twist allowance within the system shown in FIG. 3A, that can be implemented in an embodiment of the present invention.

FIG. 7 is a flow diagram illustrating an exemplary method for performing cable twist allowance within the system shown in FIG. 3A. The method 700 begins at operation 710, where cables grouped into cable sets are inserted through openings within an inner region and a periphery region of a hoop portion of the cable twist allowance system, in an alternating zigzag arrangement. From operation 710, the process continues to operation 720, where the cables are twisted and the hoop portion is deformed, to adjust the position of the cable sets to a center region of the hoop portion.

Embodiments of the present invention provide the advantages of preventing overcrowding and overtwisting of cables within a power system (e.g., a tower of a wind turbine system). Overcrowding and overtwisting is prevented by a rigid cable arrangement controlling axial tension on the system based on radial forces applied to the cables.

This written description uses examples to disclose the invention, including the best mode, and also to enable any person skilled in the art to practice the invention including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A cable twist allowance system for a wind turbine, comprising:
   a sun gear disposed within a tower of wind turbine;
   a pivot disk connected with the sun gear;
   a plurality of lever members, each including a plurality of cables and spaced a predetermined distance apart from each other, the plurality of lever members being pivotably connected with a surface of the pivot disk and rotatable about the sun gear; and
   a plurality of compression members, each corresponding to a lever member and adjusting a position thereof based on a radial force applied to the plurality of cables of the respective lever member.

2. The cable twist allowance system of claim 1, wherein the sun gear comprises a plurality of gears at a periphery region thereof and the plurality of lever members each comprise a plurality of gears at a region thereof corresponding to and engaging with the plurality of gears of the sun gear.

3. The cable twist allowance system of claim 2, wherein the each lever member includes a housing section at an opposite end of the end of the lever member comprising the plurality of gears, for housing cables therein.

4. The cable twist allowance system of claim 3, wherein the housing section is formed by a wire restraint portion configured to restrain the cables within the housing section.

5. The cable twist allowance system of claim 1, wherein the lever compression member comprises a spring member.

6. The cable twist allowance system of claim 1, wherein each compression member connects a lever member to an adjacent lever member along the periphery region of the sun gear.

7. The cable twist allowance system of claim 1, wherein a diameter of the cable twist allowance system is varied dependent upon radial forces applied to the plurality of cables which adjust the position of the respective lever member having the plurality of cables.

8. The cable twist allowance system of claim 1, wherein the compression members are disposed along a central area surface of the sun gear and are arranged to correspond to and in connection with one or more lever members.

9. The cable twist allowance system of claim 8, wherein the compression members adjust the position of a respective lever member based on radial forces applied to the plurality of cables within the respective lever member.

10. The cable twist allowance system of claim 9, wherein the sun gear duplicates the position of the respective lever member for a position of each remaining lever member to correspond to the position of the respective lever member.

11. A method for performing cable twist allowance within a wind turbine system, the method comprising:
   receiving cable sets including a plurality of cables within housing sections of lever members attached to a sun gear within a cable twist allowance system housed within a tower of the wind turbine system; and
   adjusting a position of a lever member based on a radial force applied to the plurality of cables within a cable set of the lever member.

12. The method of claim 11, wherein the lever members are pivotably connected with a pivot disk connected to the sun gear, and rotatable about the sun gear.

13. The method of claim 11, wherein the position of the lever member is adjusted using a compression member attaching the lever member to an adjacent lever member along a surface of the sun gear.

14. The method of claim 11, wherein adjusting the position of the lever member adjusts a diameter of the cable twist allowance system within the tower.

* * * * *